United States Patent Office 2,731,429
Patented Jan. 17, 1956

2,731,429
EPOXY PHENOLIC ETHERS IN MANUFACTURE OF OIL ALKYDS

William P. Cody, Lombard, and Telford C. Wollan, Cicero, Ill., assignors to Alkydol Laboratories, Inc., Cicero, Ill., a corporation of Illinois No Drawing. Application April 13, 1951,
Serial No. 220,980

12 Claims. (Cl. 260—22)

This invention relates to oil-modified alkyd resins chemically changed by the epoxide alkyl ethers of mono-hydric phenols, i. e. containing the

group, or by the epoxide hydroxyl alkyl ethers of mono-hydric phenols, the hydroxyl group being on a different carbon atom than in the aforesaid group.

This invention in particular relates to such oil-modified alkyd resins chemically changed by inclusion in the reaction of certain alkyl epoxy ethers of monohydric phenol substituted or not by aliphatic or aromatic radical.

The oil-modified alkyd resins are, at present, widely used as an air-dry film forming material in enamels, paints, varnishes and lacquers. They are widely used for decorative and protective coatings on a large number of industrial and architectural items. As a film forming material, they are adhesive, flexible, tough and durable, but they have not found utility in surface coatings where chemical resistance is required, such as toward water, aqueous solutions of soaps, alkalies and synthetic detergents.

An object, and the primary object of the present invention, is to produce chemically changed oil-modified type alkyd resins in which the above desirable physical characteristics of the standard oil-modified alkyd resins have not been changed but there has been conferred to the liquid coating composition chemical resistance toward an unusually broad range of agents which it did not innately possess. The list of these agents recited above while not exhaustive affords a very serviceable criterion.

Whereas too the oil-modified alkyd resin coatings are characterized by a high gloss when initially applied, these coatings lose their gloss by exposure to the atmosphere, some oil bases being more pronounced than others. This is particularly noticeable in pigmented alkyd resin coating compositions. Oil-modified alkyd resins which have been chemically changed by the process of our invention do not dull in this manner.

According to the present invention the components of an oil-modified alkyd resin are heat treated with a glycidyl mono-hydric phenolic ether or other such ethers containing an alkyl epoxide group until the resinous product has bodied and the esterification is substantially complete. This last, from a practical working operation is quickly ascertained by a determination of the resin's acid value, which must not exceed 30 and preferably should approach or equal 1.

It is preferred in our invention to employ as the reactant with the components for forming the oil-modified alkyd resins the condensation product of a monohydric phenol and epichlorohydrin. These products are thought to possess the formula

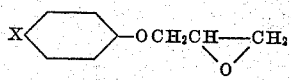

where X designates hydrogen, an aromatic or aliphatic radical; they are termed glycidyl ethers of phenol and glycidyl ethers of a substituted monohydric phenol, whose substituent is an aromatic or aliphatic radical, and the group

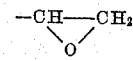

therein is referred to as an epoxide group. Such products are liquids which are thin to viscous in consistency, depending upon the phenol which has been utilized in the synthesis. If it is desired to employ a reactant which contains both an alcohol group and an expoxide group butene dioxide can be employed in the condensation with the monohydric phenol. This latter condensation product would have the formula

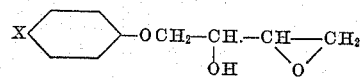

This could be designated 1,2 epoxy, 3 hydroxy butyl ether of phenol or of a substituted mono-hydric phenol, where X has the same significance.

An alkyd resin is best defined as an ester resulting from the reaction of a dibasic organic acid with an aliphatic polyhydric alcohol which is polyfunctional in the reaction because of the several —OH groups. An oil-modified alkyd resin can be defined as the complex ester resulting from the reaction of a dibasic organic acid or its anhydride and a higher fatty acid (vegetable or animal oils, the usual source) with an aliphatic polyhydric alcohol. A standard type of an oil-modified alkyd resin will be the reaction product from heating together phthalic anhydride, linseed oil fatty acids and glycerine.

The present invention can be carried out by simply substituting for all or for a portion of the polyhydric alcohol normally used in forming the alkyd resin one of the aforesaid designated ethers which are also polyfunctional in the reaction because of the epoxy group. Whereas this is a substitution insofar as the handling or compounding operation itself is concerned, there is a chemical change achieved in the oil-modified alkyd resin by the inclusion of one of these glycidyl ethers of a monohydric phenol above described or a mixture of them.

Applicants recognize that the reaction of chlorhydrins with phenols (both mono and poly) to form phenyl ethers of glycerine has long been known. Endemann, U. S. Patent #599,123, obtains glyceryl ethers of phenol, thymol and naphthols using chlorhydrins upon the phenol in molecular proportions; the products are referred to as having medicinal uses. More recently much attention has been given to this type of reaction in the production of polymeric polyhydric alcohols, wherein the reactants are polyhydric phenols and either chlorhydrins or polyepoxy compounds. A product which is commercially available today is formed by reacting bis-phenol with epichlorohydrin and an alkali. It is a solid resinous product. Chemically it is a linear condensation polymer and a polyhydric alcohol of high molecular weight of the order of 500–2,000.

Applicants do not employ polymeric polyhydric alcohols, which are inherently characterized by the polymeric structure —[—O—R—O—R$_1$]$_n$— in which R is the residue of a dihydric phenol and R$_1$ is the residue of a polyfunctional alcohol-contributing reactant, such as an epichlorohydrin, a polychlorohydrin or a polyepoxide compound. We employ a monomeric epoxy alkyl ether of phenol or of a substituted monohydric phenol, more particularly a glycidyl ether of a monohydric phenol. The phenyl group may be substituted one or more times by an aliphatic or aromatic radical and in different positions in reference to the phenolic hydroxyl group. But the unsubstituted phenol ether itself may be used. Such types of monomeric ethers of mono-hydric phenols as xylenol, ortho-cresol, paratertiary butyl phenol, octyl phenol, nonyl phenol, para phenyl phenol and ortho phenyl phenol are thin to viscous liquids, having a water-white to amber color. They possess high boiling points, that is, above 250° C. at 760 mm. pressure. They are not solid like the resinous polymer condensation products containing epoxide and hydroxyl groups referred to in the preceding paragraphs.

By our invention one of these mono-hydric phenyl ethers is heated with the components for forming an oil-modified alkyd resin, comprising a dibasic acid or its anhydride, a higher fatty acid and an aliphatic polyhydric alcohol until the product has become viscous and the esterification is substantially complete. Customarily this is gauged by the attainment of an acid value in the range from 1 to 30, which is easily measured. The viscosity will depend upon the amount of higher fatty acid or acids, as well as upon the type of each, especially the high molecular weight fatty acids. The unsaturated higher fatty acids are more commonly used, frequently containing major amounts of polyenic higher fatty acids, such as the mixed fatty acids from vegetable and animal oils; the fatty acids of such oils are of both the unsaturated and saturated types, but the saturated type is present in lesser amount. The viscosity of the product however is usually greater than 500 poises.

In the preparation of the preferred reactant for treating the components of an oil-modified resin, epichlorohydrin is caused to react with a monohydric phenolic compound. Using a 1:1 molal ratio of a monohydric phenol to epichlorohydrin, the reaction is believed to proceed as follows:

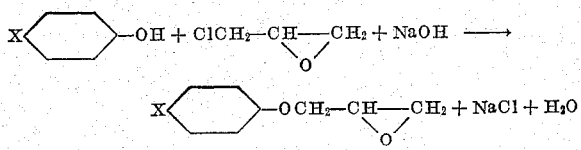

where X is H or an aliphatic or aromatic hydrocarbon group and which may be present in either the ortho, meta or para position with respect to the phenol group. This reaction is referred to in U. S. Patent # 2,221,771, and J. Chem. Soc., 1932, 1965–72. The glycidyl ether of an unsubstituted monohydric phenol or of a substituted monohydric phenol behaves like a dihydric alcohol and is readily esterified by carboxylic acids, but without generation of that amount of water in the resin-forming reaction which derives from such a dihydric alcohol.

The preparation of the oil-modified alkyd resins chemically changed by a glycidyl-ether of a monohydric phenolic compound are illustrated by the following examples. These examples serve to illustrate the invention and in no sense is the invention limited thereto.

In several of the examples the formations of the monomeric phenolic ethers are described but form no part of the present invention.

EXAMPLE I 255 grams of para-tertiary butyl phenol and 75 grams of sodium hydroxide were dissolved in 500 grams of water. 140 grams of epichlorohydrin were added at 110° F. and agitation started. The temperature rose to 130° F., and after 45 minutes the temperature had decreased to 120° F. The reaction mixture (liquid) was then heated to 180° F. to insure completion of the condensation. It was then cooled, neutralized with acid, and washed several times with water. The viscous liquid obtained was dehydrated by heating in an open beaker using good agitation. The yield of dehydrated condensation product was 84% of the theoretical yield. This product is the glycidyl ether of para-tertiary butyl phenol.

Color_____ 8–9, Gardner scale, 1933.
Viscosity_____ 4.35 poises, at 77° F.
Specific gravity_____ 1.10, at 77° F.
Combining weight_____ 102.

440 grams of refined linseed oil and 130 grams of pure pentaerythritol were heated in the presence of a small amount of lead oxide at 450° F. until alcoholysis was complete. 150 grams of the condensate, as previously prepared, and 280 grams of phthalic anhydride were added to this. The temperature was returned to 450° F. and the resultant resin was held until the desired acid number and viscosity mentioned below had been attained. This resin was reduced to a 50% concentration of solids in mineral spirits.

The constants of the resin solution were as follows:

Color_____ 7–8, Gardner scale, 1933.
Viscosity_____ $Z_3$, Gardner-Holdt scale, at 77° F.
Acid number on solids. 8.4.

When 0.05% cobalt and 0.5% lead were added to the alkyd resin solution as soluble naphthenates, films of this varnish dried to tough, flexible, glossy coatings. Determinations made thereon were as follows:

Air dry time at room temperature: 4 hours.
After 48 hours, dried films had the following properties:

Immersion in 3% NaOH aqueous solution. 9 hours, unaffected; 24 hours, film soft and white.
Cold water immersion_____ Not affected after 72 hours.
Gasoline immersion_____ Not affected after 72 hours.

EXAMPLE II 310 grams of para octyl phenol and 75 grams of sodium hydroxide were dissolved in 500 grams of water. 140 grams of epichlorohydrin was added at 110° F. Agitation of the mixture was started and the temperature gained 135° F. in 45 minutes. The temperature was then increased to 180° F. by heating. The mixture was then cooled, neutralized with acid, and washed several times with cold water. The liquid condensation product, which is the glycidyl ether of para octyl phenol, was dehydrated by heating in an open beaker using good agitation.

284.2 grams of refined soyabean oil and 93.8 grams of 98% glycerol were heated at 450° F. with a small amount of lead oxide until alcoholysis was complete. 109.2 grams of the glycidyl ether of the para octyl phenol prepared as above described, and 212.8 grams of phthalic anhydride were added to this liquid product and the temperature was held at 450° F. until the acid number was less than 8. The resin was reduced to 50% solids in mineral spirits.

Resin solution constants:

Color_____ 7–8, Gardner scale, 1933.
Viscosity at 77° F_____ L–M, Gardner-Holdt scale.
Acid number on solids_____ 6.16.

When 0.05% cobalt and 0.5% lead were added to the alkyd resin solution as soluble naphthenates, films of this varnish dried to tough, flexible, glossy coatings. Determinations made thereon were as follows:

Air dry time at room temperature: 7 hours.
After 48 hours, dried films had the following properties:

Immersion in 3% NaOH aqueous solution. 8 hours, unaffected; 15 hours, film destroyed.
Cold water immersion_____ Not affected after 72 hours.
Gasoline immersion_____ Not affected after 72 hours.

EXAMPLE III 301.0 grams of refined linseed oil and 94.5 grams of pure pentaerythritol were heated at 450° F. with a small quantity of lead oxide until alcoholysis was complete. 108.5 grams of the glycidyl ether of para octyl phenol and 196.0 grams of phthalic anhydride were then added and the mixture cooked at 450° F. until a low acid value and high body were obtained. The resin was reduced to 50% solids in mineral spirits.

Resin solution constants:

Color_____ 8, Gardner scale, 1933.
Viscosity at 77° F___ $Z_2$–$Z_3$, Gardner-Holdt scale.
Acid number on solids____ 10.1.

When 0.05% cobalt and 0.5% lead were added to the alkyd resin solution as soluble naphthenates, films of this varnish dried to tough, flexible, glossy coatings. Determinations made thereon were as follows:

Air dry time at room temperature: Set to touch 1½ hours; dry hard 6 hours.

After 48 hours, dried films had the following properties:

Immersion in 3% NaOH aqueous solution. 8 hours, unaffected; 22 hours, film destroyed.
Cold water immersion_____ Not affected after 72 hours.
Gasoline immersion_____ Not affected after 72 hours.

EXAMPLE IV 284 grams of refined soyabean oil, 122 grams of Chinawood oil, and 134 grams of glycerol were heated at 450° F. with a small amount of lead oxide until alcoholysis was complete. 156 grams of the glycidyl ether of para octyl phenol and 304 grams of phthalic anhydride were then added and the resin cooked at 450° F. until it had a low acid number of the order of 10 and a high viscosity. The resin was then reduced to 50% solids in mineral spirits.

Resin solution constants:

Color_____ 7–8, Gardner scale, 1933.
Viscosity at 77° F_____ X–Y, Gardner-Holdt scale.
Acid number on solids_____ 8.4.

When 0.05% cobalt and 0.5% lead were added to the alkyd resin solution as soluble naphthenates, films of this varnish dried to tough, flexible, glossy coatings. Determinations made thereon were as follows:

Air dry time at room temperature: Set to touch—1 hour; dry hard—7 hours.

After 48 hours, dried films had the following properties:

Immersion in 3% NaOH aqueous solution. 16 hours, not affected; 24 hours, destroyed.
Cold water immersion_____ Not affected after 72 hours.
Gasoline immersion_____ Not affected after 72 hours.

EXAMPLE V 210.0 grams of refined linseed oil and 70.0 grams of 98% glycerol were heated at 450° F. with a small amount of lead oxide until alcoholysis was complete. 175.0 grams of the glycidyl ether of para-tertiary butyl phenol and 245.0 grams of phthalic anhydride were then added and the mixture cooked until a high viscosity and low acid number were obtained. The resin was reduced to 50% solids with VM&P naphtha.

Resin solution constants:

Color_____ 10–11, Gardner scale, 1933.
Viscosity at 77° F_____ S, Gardner-Holdt scale.
Acid number on solids_____ 19.

When 0.05% cobalt and 0.5% lead were added to the alkyd resin solution as soluble naphthenates, films of this varnish dried to tough, flexible, glossy coatings. Determinations made thereon were as follows:

Air dry time at room temperature:

Set to touch_____ 1.5 hours.
Tack free_____ 3.0 hours.
Dry hard_____ 6.0 hours.
Baking time_____ 15 minutes at 300° F.

After 48 hours, dried films had the following properties:

Immersion in 3% NaOH aqueous solution: Air dried panel was unchanged after 6 hours' immersion; after 24 hours' immersion film became soft and white. Baked film was not affected after 24 hours' immersion. Baked film containing 24% "Uformite MX–61" was not affected after 72 hours' immersion.

Ethylene glycol immersion: Product of this example, and same containing 20% "Uformite MX–61," baked on tin were not affected after 24 hours' immersion in ethylene glycol.

Boiling water immersion: Film containing 20% "Uformite MX–61" and baked on tin was not affected after 30 minutes in boiling water.

NOTE.—"Uformite" is a butylated melamine formaldehyde produced and sold by the Rohm and Haas Company, Philadelphia, Pennsylvania.

EXAMPLE VI 210.0 grams of refined soyabean oil and 70.0 grams of refined 98% glycerol were heated at 450° F. using lead oxide as catalyst until alcoholysis was complete. 280.0 grams of phthalic anhydride, 70.0 grams of refined glycerol, and 70.0 grams of the glycidyl ether of para-tertiary butyl phenol were added and the mixture cooked at 450° F. until a high viscosity and low acid number were attained. The resin was reduced to 60% solids with xylol.

Resin solution constants:

Color_____ 7–8, Gardner scale, 1933.
Viscosity at 77° F_____ X, Gardner-Holdt scale.
Acid number on solids_____ 8.96.

When 0.05% cobalt and 0.5% lead were added to the alkyd resin solution as soluble naphthenates, films of this varnish dried to tough, flexible, glossy coatings. Determinations made thereon were as follows:

Air dry time at room temperature:

Set to touch_____minutes__ 30
Dry hard_____hours__ 23

After 48 hours, dried films had the following properties:

Immersion in 3% NaOH aqueous solution: After 15 hours' immersion film was white and soft, but recovered in 24 hours. Film containing 20% "Uformite MX–61" and baked for 15 minutes at 300° F. was not affected after 24 hours' immersion.

EXAMPLE VII 108 grams of o-cresol and 42 grams of sodium hydroxide were dissolved in 105 grams of water. 92 grams of epichlorohydrin was added at 80° F. Agitation was started and the temperature gained 90° F. in a period of 30 minutes. The mixture was then heated to 200° F., neutralized with acid, and washed several times with cold water. The washed product was dehydrated by heating in an open beaker using agitation. The resulting condensate was a high boiling liquid having a pale amber color and pleasant odor.

Color_____ 4–5, Gardner scale, 1933.
Viscosity at 77° F_____ 0.5 poise.
Specific gravity at 77° F____ 1.05.

440 grams of refined linseed oil and 130 grams of pure pentaerythritol were heated in the presence of a small amount of lead oxide at 450° F. until alcoholysis was complete. 150 grams of the glycidyl ether of o-cresol and 280 grams of phthalic anhydride were then added. The temperature was returned to 450° F. and the resin held until a high viscosity and low acid number had resulted. The resin was reduced to 50% solids in mineral spirits.

Resin solution constants:

Color_____ 7–8, Gardner scale, 1933.
Viscosity at 77° F_____ $Z_3$, Gardner-Holdt scale.
Acid number on solids_____ 8.0.

When 0.05% cobalt and 0.5% lead were added to the alkyd resin solution as soluble naphthenates, films of this varnish dried to tough, flexible, glossy coatings. Determinations made thereon were as follows:

Air dry time at room temperature: Dry hard—4 hours.

After 48 hours, dried films had the following properties:

Immersion in 3% NaOH aqueous solution. 9 hours, not affected; 24 hours, film soft and white.
Gasoline immersion_____ Not affected after 72 hours.
Cold water immersion____ Not affected after 72 hours.

EXAMPLE VIII 164 grams of para tertiary butyl cresol was mixed with 86 grams of butene dioxide in a pressure vessel and heated to 176° F. and held for 16 hours at this temperature with constant shaking. The material, when cooled and removed from bomb, was a clear amber colored syrup. The material was extracted with 300 grams boiling water to remove any water-soluble glycols that could possibly be formed. After drying at 176° F. under 15 inches of vacuum, a yield of 245 grams of a syrup was obtained which, by its combining weight is believed to be essentially as follows in structure:

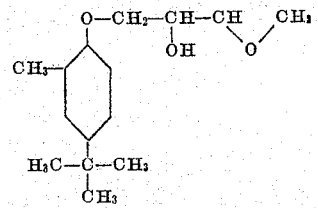

This compound can be termed 1,2 epoxy, 3 hydroxy butyl ether of para tertiary butyl cresol. This is an example of an epoxy phenolic ether other than glycidyl, useful in the present invention.

The recorded constants were:

Color _____ 7–8, Gardner scale, 1933.
Viscosity at 77° F_____ 6 poises.
Specific gravity at 77° F__ 1.12.
Combining weight_____ 87.

60 grams of this above condensate was heated with 100 grams of alkali refined linseed oil and a small amount of litharge to 500° F. and held at that temperature until soluble in mineral spirits (1 part mixture, 3 parts mineral spirits) 40 grams of phthalic anhydride was then added and a temperature of 450° F. was held until the reaction was essentially complete as evidenced by an acid value of 8. The alkyd resin, upon completion of reaction, was dissolved in mineral spirits to a 50% solid resin concentration. The constants of this solution were:

Percent solids_____ 50.
Weight per gallon at 77° F. 7.75 pounds.
Viscosity at 77° F_____ Z₃–Z₄, Gardner-Holdt scale.
Color _____ 8–9, Gardner scale, 1933.
Acid number on solids___ 8.

When suitable paint driers were added, films of this alkyd resin solution dried rapidly to tough, flexible coatings:

Air dry time at room temperature: 4 hours, tack-free.

After 48 hours, dried films had the following properties:

Immersion in 3% NaOH aqueous solution. No effect 48 hours.
Cold water immersion_____ No effect 72 hours.
Gasoline immersion_____ No effect 72 hours.
Immersion in 5% "Ivory" soap solution. No effect 72 hours.

"Ivory" soap is a product of Procter and Gamble Company, Cincinnati, Ohio.

In the presentation herein it has been asserted that by the heat treatment of the constituents which enter into an oil-modified alkyd resin with mono-hydric phenolic ethers of alkyl epoxides, more particularly a glycidyl ether of phenol or of a substituted mono-hydric phenol, where the substituent is an aliphatic or aromatic radical, or 1,2 epoxy 3 hydroxy butyl ether of such a phenol, the resulting liquid resinous product of each has retained all of the properties of the normal alkyd resin prepared from the constituents common to both types: unsaturated higher fatty acids, a dibasic carboxylic acid and an aliphatic polyhydric alcohol; but there has been imparted thereto pronounced chemical resistance toward water, solutions of alkali, soap, synthetic detergents and salt. To substantiate this assertion and indicate the order of magnitude of resistance of its dried films toward water and an aqueous solution of alkali (caustic soda) Table 1 showing this is herewith presented, the comparisons being based upon the resinous product in four examples given above. To the various coating compositions were added identical amounts of cobalt and lead driers. The tests shown below were made on films applied to glass by an applicator, giving a dried film thickness of 1.2 mils.

*Table 1*

|  | Example I | Comparison Alkyd A | Example II | Comparison Alkyd B | Example V | Comparison Alkyd C | Example VI | Comparison Alkyd D |
|---|---|---|---|---|---|---|---|---|
| Phthalic anhydride content | 28% | 28% | 30.5% | 30.5% | 35% | 35.3% | 40% | 41%. |
| Drying oil content | Linseed, 44%. | Linseed, 57%. | Soyabean, 41%. | Soyabean, 53%. | Linseed, 30%. | Linseed, 45%. | Soyabean, 30%. | Soyabean, 38%. |
| Polyalcohol | Pentaerythritol. | Pentaerythritol. | Glycerine. | Glycerine. | Glycerine. | Glycerine. | Glycerine. | Glycerine. |
| Phenol alcohol ether | 15% | 0% | 15.5% | 0% | 25% | 0% | 10% | 0% |
| Air-dry Film Properties: |  |  |  |  |  |  |  |  |
|   Dry time | 4 | 3 | 7 | 6 | 3 | 3 | 24 | 24 |
|   Water resistance [1] | 72 hrs., no change. | 72 hrs., white. | 72 hrs., no change. | 72 hrs., white. | 72 hrs., no change. | 72 hrs., white. | 72 hrs., no change. | 72 hrs., white. |
|   Gasoline resistance [1] | ---do----- | 72 hrs., soft. | ---do------ | 72 hrs., soft. | ---do------ | 72 hrs., no change. | ---do------ | 72 hrs., no change. |
|   3% alkali resistance [1] | 9 hrs | 2 hrs | 9 hrs | 1 hr | 9 hrs | 1 hr | 9 hrs | 1½ hrs. |
| Baked Film Properties: |  |  |  |  |  |  |  |  |
|   Bake time |  |  |  |  | 15 mins | 15 mins | 15 mins | 15 mins. |
|   Water resistance [1] |  |  |  |  | 72 hrs | 72 hrs., slight white. | 72 hrs | 72 hrs., white. |
|   Gasoline resistance [1] |  |  |  |  | ---do------ | 72 hrs | ---do------ | 72 hrs. |
|   3% alkali resistance [1] |  |  |  |  | 24 hrs | 2 hrs | 16 hrs | 2 hrs. |
| Baked Film Containing 20% Melamine Resin: |  |  |  |  |  |  |  |  |
|   Bake time |  |  |  |  | 15 mins | 15 mins | 15 mins | 15 mins. |
|   Water resistance [1] |  |  |  |  | 72 hrs | 72 hrs | 72 hrs | 72 hrs. |
|   Gasoline resistance [1] |  |  |  |  | ---do------ | ---do------ | ---do------ | Do. |
|   3% alkali resistance [1] |  |  |  |  | ---do------ | 4 hrs | 24 hrs | 6 hrs. |

[1] After 48 hours' drying time at room temperature.

Since a common commercial outlet for oil-modified alkyd resins is in enamels we present in Table 2 below, the tests on enamels made from conventional soya oil alkyds and our chemically modified soya oil alkyds.

ENAMEL FORMULATION USED IN TESTING AFORESAID RESIN PRODUCTS

| | Parts by weight |
|---|---|
| TiO₂, rutile anatase | 97.5 |
| TiO₂, +70% CaSO₄ | 66.5 |
| Alkyd resin | 125.0 |

The above ingredients were mixed and ground on a three roll mill. There was then added:

| | |
|---|---|
| Alkyd resin | 211.0 |
| 6% cobalt naphthenate | 1.3 |
| 24% lead naphthenate | 2.0 |
| Anti-skilling agent | 1.5 |

The above formulation produced enamels which dried to hard, glossy films.

*Table 2*

| | Example II | Comparison B | Example VI | Comparison D | Comparison E |
|---|---|---|---|---|---|
| Phthalic anhydride | 30.5% | 30.5% | 40% | 41% | 30.5%. |
| Oil content | 41% | 53% | 30% | 38% | 41%. |
| Phenol ether | 15.5% | 0 | 10% | 0 | 0. |
| Other modification | 0 | 0 | 0 | 0 | 15.5% Phenol Aldehyde Resin. |
| 60° Gloss meter: Gloss, 48 hrs | 88 | 85 | 85 | 85 | 87. |
| Gloss, 6 months | 80 | 57 | 80 | 60 | 75. |
| Color, initial | White | White | White | White | White. |
| Color, 6 months' presence of light | ---do--- | ---do--- | ---do--- | ---do--- | Yellowed. |
| Color, 6 months—no light | ---do--- | ---do--- | ---do--- | ---do--- | Do. |

Examples III, IV, VII and VIII are not included in Table I, which is limited to certain tests. The following Table III summarizes the composition of all the examples, and gives the percentage content of the phenol alcohol ether.

*Table III*

(Approximate composition)

| | Example | | | | | | | |
|---|---|---|---|---|---|---|---|---|
| | I | II | III | IV | V | VI | VII | VIII |
| (1) Dibasic Acid | 280 | 212.8 | 1.96 | 304 | 245 | 280 | 280 | 40 |
| (2) Fatty Acid Glycerides | 440 | 284.2 | 94.5 | 406 | 210 | 210 | 440 | 100 |
| (3) Polyhydric Alcohol | 130 | 93.8 | 94.5 | 134 | 70 | 70 | 130 | |
| (4) Phenol Alcohol Ether | 150 | 109.2 | 108.5 | 156 | 175 | 70 | 150 | 60 |
| Percent of (4) | 15 | 15.5 | 22 | 15.6 | 25 | ¹11.1 | 15 | 60 |

¹ Table I gives 10%.

The range of usage of the polyfunctional phenol alcohol ether is from about 10% to 60% by weight of all the ingredients forming the resin.

Having given representative, illustrating examples of our invention we wish to make a further explanation as to the components in oil-modified alkyd resins which we chemically treat.

Instead of glycerine and pentaerythritol, we may employ any of the other aliphatic polyhydric alcohol compounds capable of being used in making alkyd resins, more particularly those in more or less conventional usage such as sorbitol, mannitol, glycols, tri-methylol propane and poly pentaerythritols.

Whereas we use phthalic anhydride as the dibasic acid in all of the examples herein, we wish it to be known that any other dibasic acid, such as adipic, maleic, sebacic, diglycollic, etc. may be used.

Although we prefer the use of linseed, soya, and dehydrated castor oil fatty acids, we intend to include any and all vegetable or animal oil acids having usefulness in oil-modified alkyd resins, exclusive of the hydroxy carboxylic acids.

By the term "higher fatty acids" we mean the aliphatic mono-carboxylic acids having a chain length of at least 8 carbon atoms and preferably 12 or more, which acids are normally present in substantial percentages in the common vegetable and animal oils and by the term "unsaturated higher fatty acids" we mean the olefinic mono-carboxylic acids whether mono-olefinic, di-olefinic, tri-olefinic, or having more olefinic linkages, of this same characterization. We do not embrace however the hydroxy aliphatic mono-carboxylic acids or its esters whether unsaturated or saturated.

As will be noted from the examples the free higher fatty acids need not be employed with unreacted glycerine or other aliphatic polyhydric alcohols, for the alcoholyzed esters obtained from heating the glycerides with glycerine, pentaerythritol or other aliphatic alcohols can be satisfactorily and less expensively employed.

Although we have described in detail preferred forms of the invention, it will be apparent to those skilled in the art that various modifications may be made therein without departing from the spirit of the invention. Therefore the invention is not limited by these examples but solely by the scope of the claims as construed by the entire disclosure.

We claim as our invention:

1. In the production of oil-modified alkyd resin having an acid value in the range from 1 to 30 by reaction of acidic material selected from the group consisting of dicarboxylic organic acids and their anhydrides, aliphatic polyhydric alcohol for poly-functional reaction with said acidic material, and glycerides of fatty acid selected from the group consisting of saturated and unsaturated mono-carboxylic fatty acids having upwardly from 8 carbon atoms, the improvement comprising substituting for at least a portion of said aliphatic polyhydric alcohol, normally fluid epoxy-containing ether which is the product of etherifying monohydric phenol with a primary alkyl alcohol selected from the group consisting of glycidol and 1-2-epoxy-3-4-dihydroxy-n-butane for ester-formation with the acidic material, said ether constituting from about 10% to 60% by weight of the ingredients forming the resin.

2. In the production of oil-modified alkyd resin having an acid value in the range from 1 to 30 by reaction of acidic material selected from the group consisting of dicarboxylic organic acids and their anhydrides, aliphatic polyhydric alcohol for poly-function reaction with said acidic material, and glycerides of fatty acid selected from the group consisting of saturated and unsaturated monocarboxylic fatty acids having upwardly from 8 carbon atoms, the improvement comprising substituting for at least a portion of said aliphatic polyhydric alcohol, normally fluid epoxy-containing ether which is the product of etherifying alkyl substituted monohydric phenol with a primary alkyl alcohol selected from the group consisting of glycidol and 1-2-epoxy-3-4-dihydroxy-n-butane for ester-formation with the acidic material, said ether constituting from about 10% to 60% by weight of the ingredients forming the resin.

3. In the production of oil-modified alkyd resin having an acid value in the range from 1 to 30 by reaction of acidic material selected from the group consisting of dicarboxylic organic acids and their anhydrides, aliphatic polyhydric alcohol for poly-functional reaction with said acidic material, and glycerides of fatty acid selected from the group consisting of saturated and unsaturated monocarboxylic fatty acids having upwardly from 8 carbon atoms, the improvement comprising substituting for at least a portion of said aliphatic polyhydric alcohol, normally fluid glycidyl ether of monohydric phenol for ester-formation with the acidic material, said ether constituting from about 10% to 60% by weight of the ingredients forming the resin.

4. In the production of oil-modified alkyd resin having an acid value in the range from 1 to 30 by reaction of phthalic anhydride, aliphatic polyhydric alcohol for polyfunctional reaction with said phthalic anhydride, and glycerides of fatty acid selected from the group consisting of saturated and unsaturated monocarboxylic fatty acids having upwardly from 8 carbon atoms, the improvement comprising substituting for at least a portion of said aliphatic polyhydric alcohol, normally fluid epoxy-containing ether which is the product of etherifying monohydric phenol with a primary alkyl alcohol selected from the group consisting of glycidol and 1-2-epoxy-3-4-dihydroxy-n-butane for ester-formation with the phthalic anhydride, said ether constituting from about 10% to 60% by weight of the ingredients forming the resin.

5. In the production of oil-modified alkyd resin having an acid value in the range from 1 to 30 by reaction of acidic material selected from the group consisting of dicarboxylic organic acids and their anhydrides, aliphatic polyhydric alcohol for poly-functional reaction with said acidic material, and glycerides of fatty acid selected from the group consisting of saturated and unsaturated monocarboxylic fatty acids having upwardly from 8 carbon atoms, the step of substituting for at least a portion of said aliphatic polyhydric alcohol, normally fluid glycidyl ether of alkyl-substituted monohydric phenol for ester-formation with the acidic material, said ether constituting from about 10% to 60% by weight of the ingredients forming the resin.

6. In the production of oil-modified alkyd resin having an acid value in the range from 1 to 30 by reaction of phthalic anhydride, aliphatic polyhydric alcohol for polyfunctional reaction with said phthalic anhydride, and glycerides of fatty acid selected from the group consisting of saturated and unsaturated monocarboxylic fatty acids having upwardly from 8 carbon atoms, the improvement comprising substituting for at least a portion of said aliphatic polyhydric alcohol, normally fluid glycidyl ether of monohydric phenol for ester-formation with the phthalic anhydride, said ether constituting from about 10% to 60% by weight of the ingredients forming the resin.

7. In the production of oil-modified alkyd resin having an acid value in the range from 1 to 30 by reaction of phthalic anhydride, aliphatic polyhydric alcohol for polyfunctional reaction with said phthalic anhydride, and glycerides of fatty acid selected from the group consisting of saturated and unsaturated monocarboxylic fatty acids having upwardly from 8 carbon atoms, the improvement comprising substituting for at least a portion of said aliphatic polyhydric alcohol, normally fluid glycidyl ether of alkyl-substituted monohydric phenol for ester-formation with the phthalic anhydride, said ether constituting from about 10% to 60% by weight of the ingredients forming the resin.

8. In the production of oil-modified alkyd resin having an acid value in the range from 1 to 30 by reaction of acidic material selected from the group consisting of dicarboxylic organic acids and their anhydrides, aliphatic polyhydric alcohol for poly-functional reaction with said acidic material, and glycerides of fatty acid selected from the group consisting of saturated and unsaturated monocarboxylic fatty acids having upwardly from 8 carbon atoms, the improvement comprising substituting for at least a portion of said aliphatic polyhydric alcohol, normally fluid epoxy-containing ether which is the product of etherifying para-alkyl substituted monohydric phenol with a primary alkyl alcohol selected from the group consisting of glycidol and 1-2-epoxy-3-4-dihydroxy-n-butane for ester-formation with the acidic material, said ether constituting from about 10% to 60% by weight of the ingredients forming the resin.

9. In the production of oil-modified alkyd resin having an acid value in the range from 1 to 30 by reaction of acidic material selected from the group consisting of dicarboxylic organic acids and their anhydrides, aliphatic polyhydric alcohol for poly-functional reaction with said acidic material, and glycerides of fatty acid selected from the group consisting of saturated and unsaturated monocarboxylic fatty acids having upwardly from 8 carbon atoms, the improvement comprising substituting for at least a portion of said aliphatic polyhydric alcohol, normally fluid epoxy-containing ether which is the product of etherifying para-tertiary-butyl phenol with a primary alkyl alcohol selected from the group consisting of glycidol and 1-2-epoxy-3-4-dihydroxy-n-butane for ester-formation with the acidic material, said ether constituting from about 10% to 60% by weight of the ingredients forming the resin.

10. In the production of oil-modified alkyd resin having an acid value in the range from 1 to 30 by reaction of acidic material selected from the group consisting of dicarboxylic organic acids and their anhydrides, aliphatic polyhydric alcohol for polyfunctional reaction with said acidic material, and glycerides of fatty acid selected from the group consisting of saturated and unsaturated monocarboxylic fatty acids having upwardly from 8 carbon atoms, the improvement comprising substituting for at least a portion of said aliphatic polyhydric alcohol, normally fluid glycidyl ether of octyl phenol for ester-formation with the acidic material, said ether constituting from about 10% to 60% by weight of the ingredients forming the resin.

11. In the production of oil-modified alkyd resin having an acid value in the range from 1 to 30 by reaction of acidic material selected from the group consisting of dicarboxylic organic acids and their anhydrides, aliphatic polyhydric alcohol for polyfunctional reaction with said acidic material, and glycerides of fatty acid selected from the group consisting of saturated and unsaturated monocarboxylic fatty acids having upwardly from 8 carbon atoms, the improvement comprising substituting for at least a portion of said aliphatic polyhydric alcohol, normally fluid glycidyl ether of a cresol for ester-formation with the acidic material, said ether constituting from about 10% to 60% by weight of the ingredients forming the resin.

12. In the production of oil-modified alkyd resin having an acid value in the range from 1 to 30 by reaction of acidic material selected from the group consisting of dicarboxylic organic acids and their anhydrides, aliphatic polyhydric alcohol for polyfunctional reaction with said acidic material, and glycerides of fatty acid selected from the group consisting of saturated and unsaturated monocarboxylic fatty acids having upwardly from 8 carbon atoms, the improvement comprising substituting for at least a portion of said aliphatic polyhydric alcohol, normally fluid ether which is the product of etherifying monohydric phenol having an aliphatic hydrocarbon substituent with 1-2-epoxy-3-4-dihydroxy-n-butane for ester-formation with the acidic material, said ether constituting from about 10% to 60% by weight of the ingredients forming the resin.

References Cited in the file of this patent

UNITED STATES PATENTS

| | | |
|---|---|---|
| 2,078,239 | Ellis | Apr. 27, 1937 |
| 2,133,702 | Hoover | Oct. 18, 1938 |
| 2,504,518 | Greenlee | Apr. 18, 1950 |
| 2,541,998 | De Groate et al. | Feb. 20, 1951 |
| 2,609,348 | Du Puis et al. | Sept. 2, 1952 |

OTHER REFERENCES

Turkington et al.: Abstract No. 667,476, August 30, 1949.